United States Patent
Yang et al.

(10) Patent No.: US 9,568,660 B2
(45) Date of Patent: Feb. 14, 2017

(54) DISPLAY APPARATUS AND LIGHT-EMITTING MODULE AND LIGHT-GUIDING PLATE THEREOF

(71) Applicants: INNOCOM TECHNOLOGY (SHENZHEN) CO., LTD, Shenzhen, Guangdong Province (TW); InnoLux Corporation, Jhu-Nan, Miao-Li County (TW)

(72) Inventors: Jen-Chih Yang, Jhu-Nan (TW); Cheng-Cheng Pan, Jhu-Nan (TW); Ta-Chin Huang, Jhu-Nan (TW); Chou-Yu Kang, Jhu-Nan (TW); Pu-Chun Chu, Jhu-Nan (TW)

(73) Assignees: INNOCOM TECHNOLOGY (SHENZHEN) CO., LTD, Shenzhen, Guandong Province (CN); INNOLUX CORPORATION, Jhu-Nan, Miao-Li County (TW)

( * ) Notice: Subject to any disclaimer, the term of this patent is extended or adjusted under 35 U.S.C. 154(b) by 0 days.

(21) Appl. No.: 14/959,889

(22) Filed: Dec. 4, 2015

(65) Prior Publication Data
US 2016/0085019 A1 Mar. 24, 2016

Related U.S. Application Data

(63) Continuation of application No. 14/046,536, filed on Oct. 4, 2013, now abandoned.

(51) Int. Cl.
*F21V 7/04* (2006.01)
*F21V 8/00* (2006.01)
*G02B 27/22* (2006.01)

(52) U.S. Cl.
CPC ............ *G02B 6/0038* (2013.01); *G02B 6/0036* (2013.01); *G02B 6/0058* (2013.01); *G02B 27/22* (2013.01); *G02B 6/0068* (2013.01)

(58) Field of Classification Search
CPC ... G02B 6/0038; G02B 6/0036; G02B 6/0058; G02B 6/0068; G02B 27/22
(Continued)

(56) References Cited

U.S. PATENT DOCUMENTS 5,130,898 A * 7/1992 Akahane ............... G02B 6/0036
362/236
5,584,556 A 12/1996 Yokoyama et al.
(Continued)

FOREIGN PATENT DOCUMENTS

CN 1924667 A 3/2007
CN 101168634 A 4/2008
(Continued)

*Primary Examiner* — Bryon T Gyllstrom
(74) *Attorney, Agent, or Firm* — Muncy, Geissler, Olds & Lowe, P.C.

(57) ABSTRACT

A 3D display device comprises display panel, light-guiding plate and light-emitting unit. The display panel comprises a plurality of sub-pixels with a first short-side width. The light-guiding plate comprises first flat surface, second flat surface, light input surface, and a plurality of light-guiding elements disposed at first flat surface or second flat surface. The light-emitting unit is disposed adjacent to the light input surface. Each light-guiding element comprises a curve shape with at least one inflection point, and a shift range of the curve shape is greater than zero and less than or equal to one and a half times the first short-side width. Light enters light-guiding plate and guided by light-guiding elements, and light is outputted in an alternating arrangement of at least one bright zone and at least one dark zone. A 3D display apparatus is also disclosed.

20 Claims, 8 Drawing Sheets

(58) Field of Classification Search
USPC .......................................................... 362/611
See application file for complete search history.

(56) References Cited

U.S. PATENT DOCUMENTS

| | | | |
|---|---|---|---|
| 6,582,095 B1* | 6/2003 | Toyoda | G02B 6/0038 |
| | | | 362/23.09 |
| 7,401,962 B2 | 7/2008 | Yamashita et al. | |
| 7,674,028 B2 | 3/2010 | Cassarly et al. | |
| 7,690,830 B2* | 4/2010 | Koganezawa | G02B 6/0068 |
| | | | 349/65 |
| 7,736,045 B2 | 6/2010 | Yamashita et al. | |
| 8,210,731 B2 | 7/2012 | Iwasaki | |
| 8,277,105 B2 | 10/2012 | Kim et al. | |
| 2002/0163790 A1* | 11/2002 | Yamashita | G02B 5/045 |
| | | | 362/612 |
| 2003/0090888 A1* | 5/2003 | Mizutani | G02B 6/0028 |
| | | | 362/611 |
| 2003/0103760 A1* | 6/2003 | Gardiner | G02B 6/0038 |
| | | | 385/146 |
| 2003/0147233 A1 | 8/2003 | Sugiura et al. | |
| 2004/0085750 A1 | 5/2004 | Okuwaki et al. | |
| 2005/0213348 A1* | 9/2005 | Parikka | G02B 6/0031 |
| | | | 362/619 |
| 2005/0243574 A1* | 11/2005 | Teng | G02B 6/0061 |
| | | | 362/600 |
| 2005/0281052 A1* | 12/2005 | Teng | G02B 6/0038 |
| | | | 362/615 |
| 2006/0164862 A1 | 7/2006 | Chien et al. | |
| 2006/0209563 A1* | 9/2006 | Hirota | G02B 6/0016 |
| | | | 362/608 |
| 2007/0091637 A1 | 4/2007 | Hiraishi et al. | |
| 2008/0002432 A1* | 1/2008 | Ueno | G02B 6/0028 |
| | | | 362/620 |
| 2009/0109683 A1* | 4/2009 | Miyashita | G02B 5/045 |
| | | | 362/297 |
| 2009/0167651 A1* | 7/2009 | Minano | G02B 6/0028 |
| | | | 345/84 |
| 2009/0273947 A1 | 11/2009 | Takada | |
| 2010/0142225 A1 | 6/2010 | Kurihara et al. | |
| 2011/0242441 A1 | 10/2011 | Minami | |
| 2012/0163032 A1 | 6/2012 | Hsu | |

FOREIGN PATENT DOCUMENTS

TW           200643493 A       12/2006
WO      WO2009/061135 A1       5/2009

* cited by examiner

DISPLAY APPARATUS AND LIGHT-EMITTING MODULE AND LIGHT-GUIDING PLATE THEREOF

CROSS REFERENCE TO RELATED APPLICATIONS

This application is a continuation application of U.S. Ser. No. 14/046,536, filed Oct. 4, 2013, which claims priority under 35 U.S.C. §119(a) on Patent Application No(s). 101137921, filed in Taiwan, Republic of China on Oct. 15, 2012, the entire contents of which are hereby incorporated by reference

BACKGROUND OF THE INVENTION

Field of Invention

The invention relates to a display apparatus and a light-emitting module and a light-guiding plate thereof.

Related Art

Recently, because the manufacturing process and material of light-emitting diode (LED) are improved unceasingly, the light-emitting efficiency of LED is enhanced enormously. Different from the fluorescent lamp or compact fluorescent lamp, LED has some wonderful characteristics, such as less power consumption, long lifespan, high safety, short response time and small size, thus gradually applied to a lighting apparatus, a lighting case or a lighting module. The lighting apparatus is such as an indoor or outdoor lamp, a flashlight, a headlight or taillight of a vehicle, or other kind of the lighting apparatus. The lighting module can be applied as a backlight module of a display apparatus or otherwise.

FIG. 1A is a schematic exploded diagram of a conventional display apparatus 1, and FIG. 1B is a side view of the display apparatus 1.

The display apparatus 1 includes a display panel 11 and a light-emitting module 12. The light-emitting module 12 is a backlight module of the display apparatus 1, emitting the light L through the display panel 11 for displaying images.

The light-emitting module 12 is disposed on a side of the display panel 11, and can include two lateral light sources 121, a light-guiding plate 122 and a plurality of light-guiding elements 123. The lateral light sources 121 are instanced as two LED light bars. They are disposed on two opposite sides of the light-guiding plate 122, respectively, and emit the light L entering the light-guiding plate 122 through a light input surface I of the light-guiding plate 122. Each of the light-guiding elements 123 is white ink in a form of an oblique strip, and is disposed on a bottom surface B1 of the light-guiding plate 122 by coating. The light is guided to the center portion of the light-guiding plate 122 from the lateral sides of the light-guiding plate 122 by the total reflection. The light-guiding elements 123 can interfere with the total reflection of the light so that the light can be emitted through a light output surface O of the light-guiding plate 122 and towards the display panel 11 for displaying images.

However, when the light L is outputted through the light output surface O of the light-guiding plate 122 and towards the display panel 11, the light output on the light output surface O is formed into an alternate form (alternating arrangement) of bright and dark oblique strips. For example, the odd strips are bright and the even strips are dark. By adding the influence of the light-shielding layer (i.e. the opaque black matrix, not shown) disposed in the display panel 11 in the form of strips, the light outputted through the display panel 11 will generate interference fringes (only one interference fringe is shown in the area A of FIG. 1C while the rest are not shown) due to the diffraction, shown by the area A in FIG. 1C (in which the straight strips M are caused by the light L passing through the light-shielding layer, and the oblique strips N are caused by the light on the light output surface O in an alternate form (alternating arrangement) of bright and dark oblique strips). The interference fringes are the so-called Moiré phenomenon, decreasing the display quality of the display apparatus 1.

Therefore, it is an important subject to provide a light-emitting module and a display apparatus that can change the light output form and interfere with interference fringes to improve the display quality.

SUMMARY OF THE INVENTION

In view of the foregoing subject, an objective of the invention is to provide a display apparatus, and a light-emitting module and a light-guiding plate thereof that can change the light output form and interfere with the interference fringes to improve the display quality.

To achieve the above objective, a 3D display device of the disclosure, comprises a display panel, a light-guiding plate and a light-emitting unit. The display panel comprises a plurality of sub-pixels, and each sub-pixel comprises a first short-side width. The light-guiding plate is disposed adjacent to the display panel, and the light-guiding plate comprises a first flat surface, a second flat surface, a light input surface, and a plurality of light-guiding elements. The first flat surface is disposed between the display panel and the second flat surface, the light input surface is connected between the first flat surface and the second flat surface, and the light-guiding elements are disposed at the first flat surface or the second flat surface. The light-emitting unit is disposed adjacent to light input surface. Each of the light-guiding elements comprises a curve shape with at least one inflection point, and a shift range of the curve shape of light-guiding element is greater than zero and less than or equal to one and a half times the first short-side width. The light emitted from light-emitting unit enters the light-guiding plate, the light is guided by the light-guiding plate and the light-guiding elements, and the light is outputted through the first flat surface in an alternating arrangement of at least one bright zone and at least one dark zone.

As mentioned above, the light-guiding plate of the invention includes a plurality of light-guiding elements which are disposed on one of the flat surfaces of the light-guiding plate. Each of the light-guiding elements has a curve-shape having at least an inflection point. Thereby, when emitted to the display panel through the flat surface of the light-guiding plate, the light can be formed on the flat surface as curviform in an alternate arrangement of bright and dark zones, by the disposition of the curviform light-guiding elements. Such light can decrease interference fringes caused by diffraction so that the display quality of the display apparatus can be enhanced.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
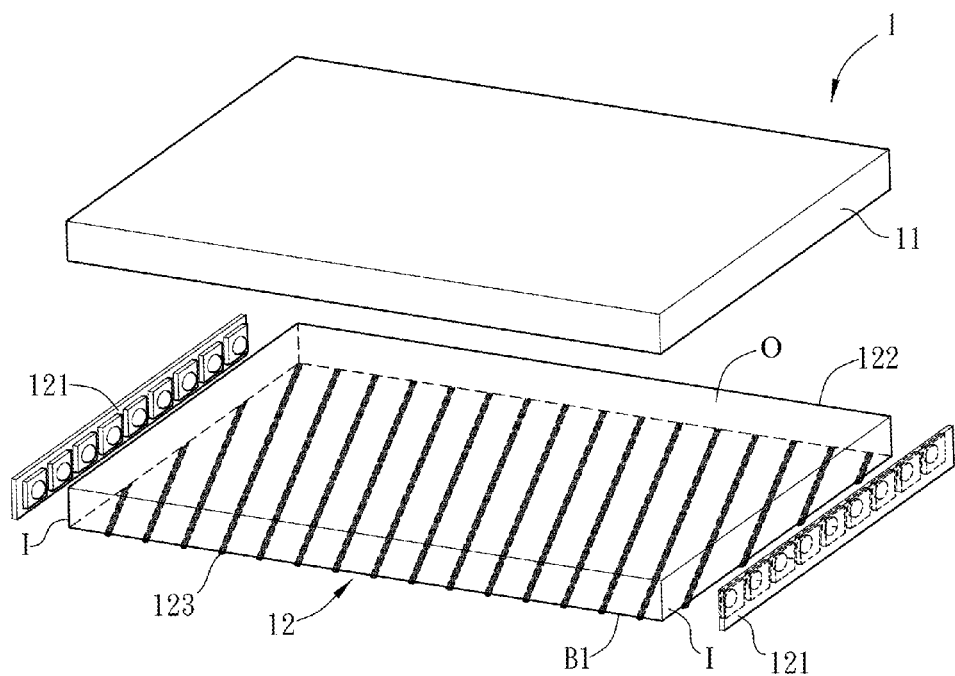
FIG. 1A is a schematic exploded diagram of a conventional display apparatus.
Figure 1B:
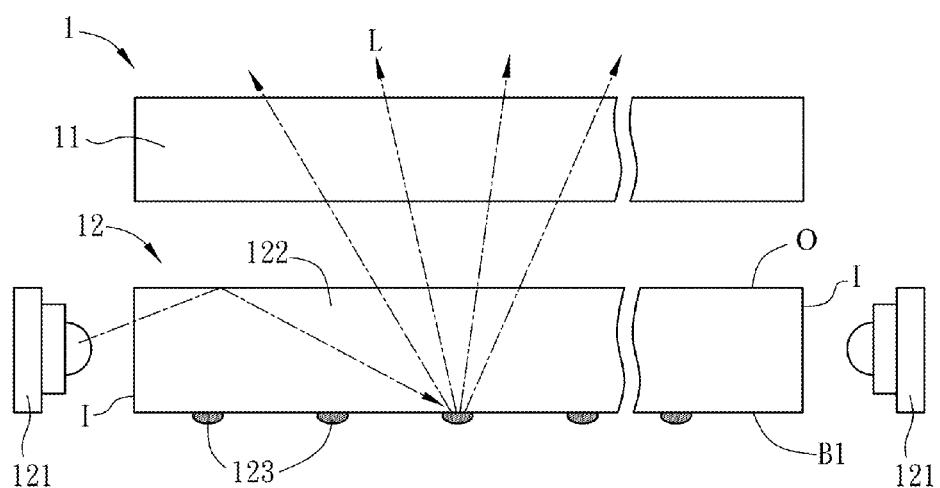
FIG. 1B is a side-view diagram of the display apparatus in FIG. 1A.
Figure 1C:
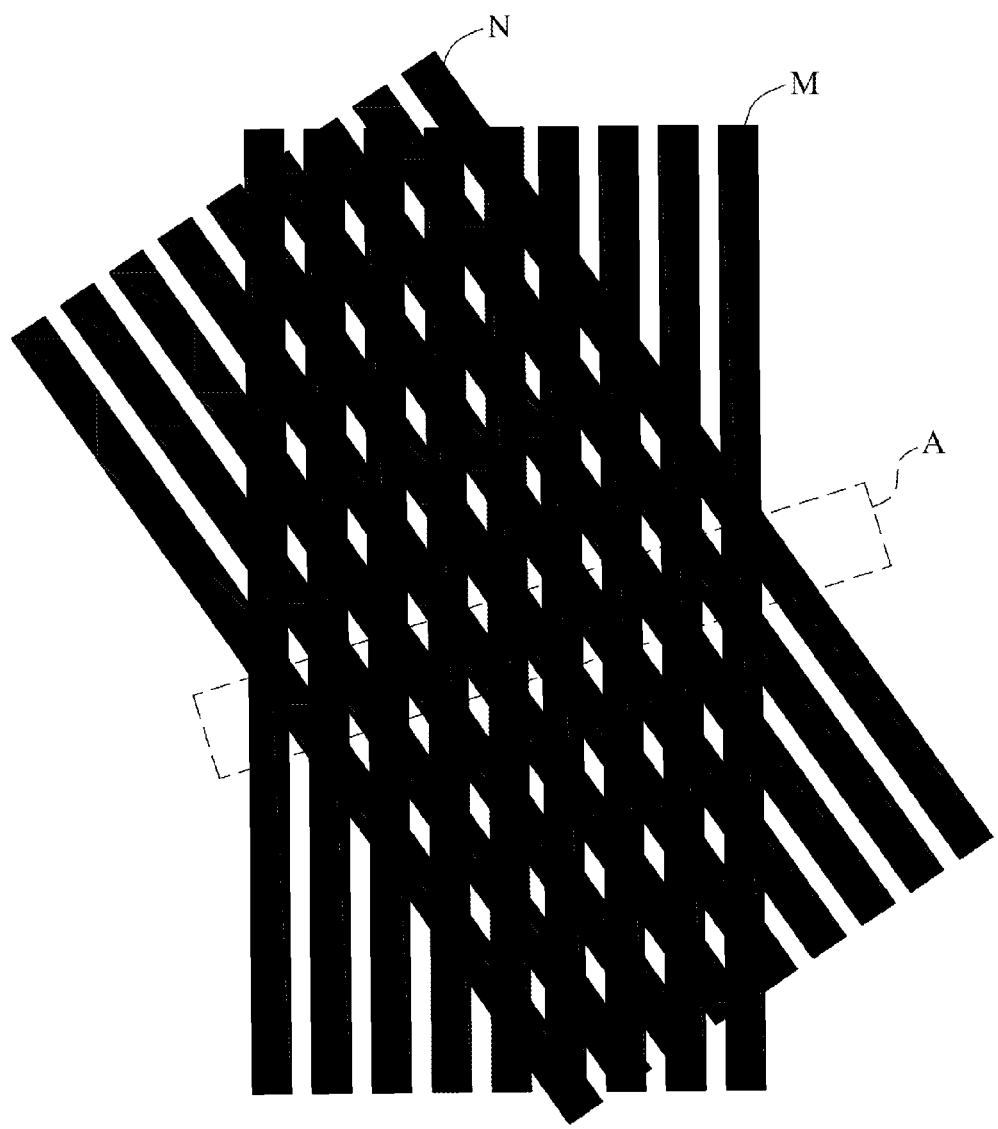
FIG. 1C is a schematic diagram of interference fringes.
Figure 2A:
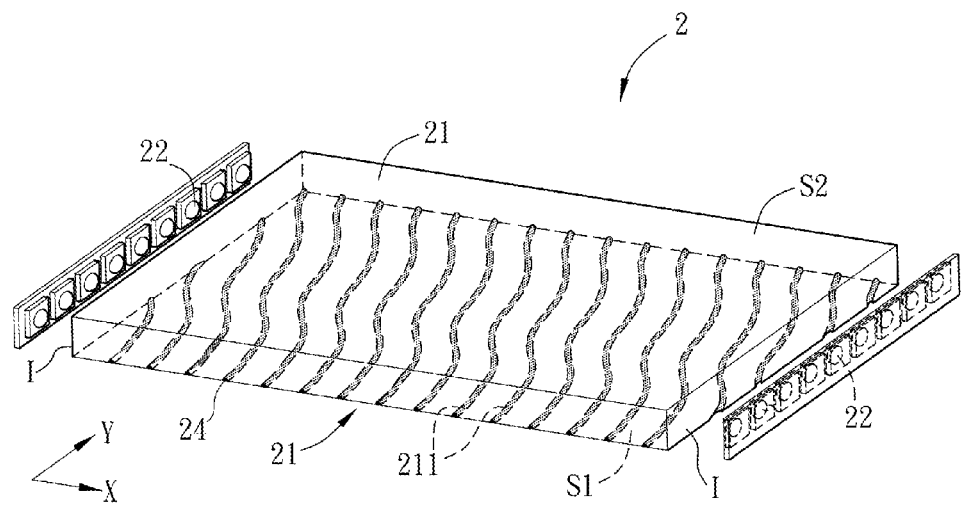
FIG. 2A is a schematic diagram of a light-emitting module of a preferred embodiment of the invention.
Figure 2B:
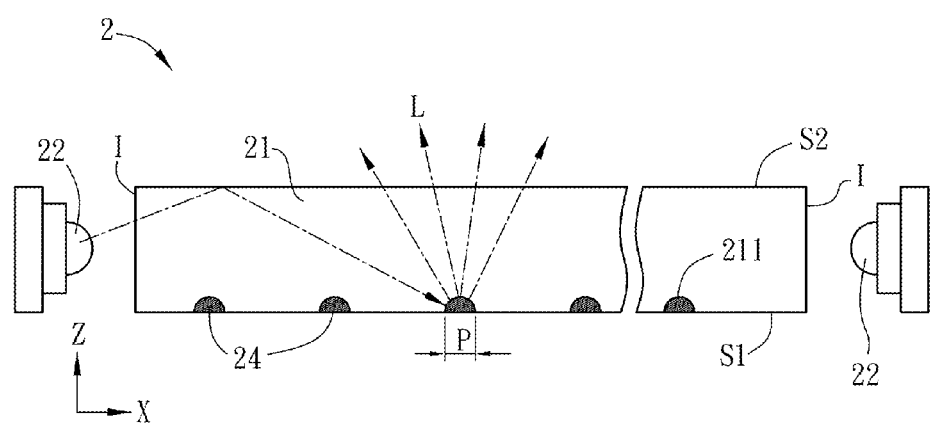
FIG. 2B is a side view of the light-emitting module in FIG. 2A.

FIG. 2A is a schematic diagram of a light-emitting module 2 of a preferred embodiment of the invention, and FIG. 2B is a side view of the light-emitting module 2. FIGS. 2A and 2B are just schematic, but not for showing the real dimensions of the objects. The light-emitting module 2 of the invention can be applied as a lighting apparatus, a backlight module of a flat display apparatus, a parallax barrier device, or a parallax prism device that can be applied to a stereoscopic display apparatus to provide the effect of the parallax barrier or the parallax prism so that the display apparatus can display stereoscopic (3D) images. The invention doesn't limit the application of the light-emitting module 2. Besides, either each module or each apparatus of the invention is configured with a driving device and driving signals, which are omitted in the following descriptions.

The light-emitting module 2 includes a light-guiding plate 21, a plurality of light-guiding elements 211 and a light-emitting unit 22.

The light-guiding plate 21 has at least a light input surface I and two opposite flat surfaces. As shown in FIG. 2B, in this embodiment, the light-guiding plate 21 has two opposite flat surfaces S1 and S2. The light-guiding plate 21 is used for guiding the traveling direction of the light, and it is made of transparent material, such as acrylic resin, polycarbonate, polyethylene resin, or glass. The said transparent materials are just for example, but not for limiting the scope of the invention. The refractive index of the transparent material is greater than that of the surrounding substance (e.g. air, the refractive index of which is about 1). Accordingly, the light with a specific incident angle can be provided the total reflection at the interface of the light-guiding plate 21 and the surrounding substance, so that the light entering through the light input surface can be guided to the central portion of the light-guiding plate 21, thereby generating more average light output form. A cross-section of the light-guiding plate 21 can be plate-shaped or wedge-shaped, for example. A plate-shaped light-guiding plate 21 is instanced here.

The flat surfaces S1 and S2 are disposed oppositely. Herein, the flat surfaces S1 and S2 are the surfaces with larger area of the light-guiding plate 21. For example, the flat surface S1 is a bottom surface of the light-guiding plate 21, and the flat surface S2 is a top surface of the light-guiding plate 21. The light input surface I is perpendicular to the flat surfaces S1 and S2. The number of the light input surface I is corresponding to the number of the light-emitting unit 22, and is at least 1. A viewer is generally located on the side of the flat surface S2 to overlook the light-emitting module 2.

The light-guiding elements 211 are disposed at least one of the flat surfaces S1 and S2 of the light-guiding plate 21, guiding or changing the traveling direction of the light by scattering, or reflecting, etc., for creating the desired light output. The light-guiding elements 211 can be located anywhere in the light-guiding plate 21 except the light input surface I. For example, all the surfaces of the light-guiding plate 21 except the light input surface I can be configured with the light-guiding elements 211, and even the inside of the light-guiding plate 21 can be configured with the light-guiding elements 211. Herein, as shown in FIGS. 2A and 2B, the light-guiding elements 211 are disposed at the flat surface S1 (bottom surface) of the light-guiding plate 21, for example. The light-guiding element 211 is a microstructure of a recess or a protrusion by viewing from the light input surface I (e.g. along the lengthwise direction of the light-emitting unit), and can be regarded as a curve substantially by viewing along a direction perpendicular to the flat surface S2 (i.e. from the flat surface S2, overlooking). Each of the curves includes at least one inflection point (through which the curve goes to concave from convex or goes to convex from concave, at which the second derivative of the curve is zero or inexistent), two or more curvature centers (the center of one of the osculating circles formed by a segment between two inflection points), and one or more curvature(s) (reciprocal of a radius of an osculating circle). By viewing from the flat surface S2, each curve of the light-guiding element 211 can have two closest parallel lines clipping the curve, and the midline of the two parallel lines is called a centerline of the curve of the light-guiding element 211.

As shown in FIG. 2A, in this embodiment, the centerline of the light-guiding element 211 is substantially an oblique line which is not parallel with both of a direction X and a direction Y (herein, the direction Y is along the direction of a long side of the light input surface I while the direction X is perpendicular to the direction Y and along the direction of a long side of the flat surface S1). The centerline of the light-guiding element 211 and the direction X or the direction Y have an included angle (acute angle), which can be between 0 and 90 degrees. In this embodiment, the centerline of each of the light-guiding elements 211 inclines to the left side. It can incline to the right side in other embodiments. Besides, as shown in FIG. 2B, by viewing along the direction perpendicular to the flat surface S1 (e.g. overlooking), each curve of the light-guiding element 211 has a short-side width P, which can be between 50 µm and 150 µm. Besides, the total length of the curve of the light-guiding element 211 is between one time and five times the length of a side (e.g. short side, the side closer to the light-emitting unit 22 and along the direction Y) of the flat surface S1, and preferably between one time and two times the length of a side of the flat surface S1.

Any two light-guiding elements 211 don't intersect each other, and that means they don't touch, connect and overlap each other. In other words, an space of the any two light-guiding elements 211 is greater than zero and less than the length of a side (e.g. the long side) of the flat surface S1. The cross-section of each of the light-guiding elements 211 as shown in FIG. 2B can be curviform, or a polygon (including a triangle, a square, a rectangle, a trapezoid, or a regular polygon) or an irregular form, such that the light-guiding element 211 can provide scattering effect, in addition to the total reflection effect provided by the other portion of the light-guiding plate 21, for achieving the light output form composed of zones of different light intensities (e.g. bright and dark zones). Herein, the cross-section of each of the light-guiding elements 211 is instanced as curviform, such as a semicircle. To deserve to be mentioned, the cross-sections of the light-guiding elements 211 can be the same or different. Besides, the centerlines of the curves of the light-guiding elements can have the same or different curvature. In this embodiment, all the light-guiding elements 211 are instanced with the same cross-section, space and curvature.

The light-emitting unit is disposed adjacent to the light input surface I of the light-guiding plate 21. In this embodiment, two light-emitting units 22 are respectively disposed adjacent to the opposite light input surfaces I for example. The light emitted by the light-emitting units 22 enters the light-guiding plate 21 through the light input surface I, and then is outputted through the flat surface S1. The light-emitting unit 22 can include, for example, at least a light-emitting diode (LED), at least an organic light-emitting diode (OLED), at least a cold cathode fluorescent lamp (CCFL), or at least a hot cathode fluorescent lamp (HCFL), as a light source of the light-emitting unit 22. Herein, the light-emitting unit 22 is instanced as an LED light bar which includes a plurality of LEDs disposed on a circuit board. In other embodiments, only a light-emitting unit can be disposed, emitting the light into the light-emitting plate 21 through a side of the light-emitting plate 21.

Reflective materials 24 are respectively disposed on the light-guiding elements 211, and capable of reflecting the light emitted by the light-emitting unit 22. The reflective material 24 can be disposed on an inner surface of the recess of the light-guiding element 211 or on an outer surface of the protrusion of the light-guiding element 211, or can be disposed in the recess of the light-guiding element 211. Herein, the reflective materials 24 are instanced as disposed in the recesses of the light-guiding elements 211. In this embodiment, the reflective material 24 in the light-guiding element 211 can interfere with the total reflection of the light L so that the light L can be emitted out through the flat surface S2 of the light-guiding plate 21 (in the case of the reflective material 24 disposed on the outer surface of the protrusion, the reflective material 24 can block the travelling of the light so that the light L is reflected to other locations). The reflective material 24 can include oxide, such as white $SiO_2$, $TiO_2$, or other substances of high reflectance. To deserve to be mentioned, the light-guiding element 211 can be configured without the reflective material 24, so the light L is guided only by scattering to be outputted through one of the flat surfaces in an alternate form (alternate arrangement) of bright and dark zones.

Accordingly, the light L emitted by the light-emitting unit 22 enters the light-guiding plate 21 through the light input surface I, then is guided and spread to the whole light-guiding plate 21 by the total reflection effect in the light-guiding plate 21, and then is scattered by the curviform light-guiding elements 211 each including at least an inflection point and disposed on one of the flat surfaces, so that the light can be emitted out through one flat surface (which can be the flat surface S1 configured with the light-guiding elements 211 or the flat surface S2) of the light-guiding plate 21 in an alternate form (alternating arrangement) of bright and dark zones. Herein, the bright zone indicates the brightness thereof is higher than that of the dark zone, and the dark zone's brightness is greater than zero.

Figure 2C:
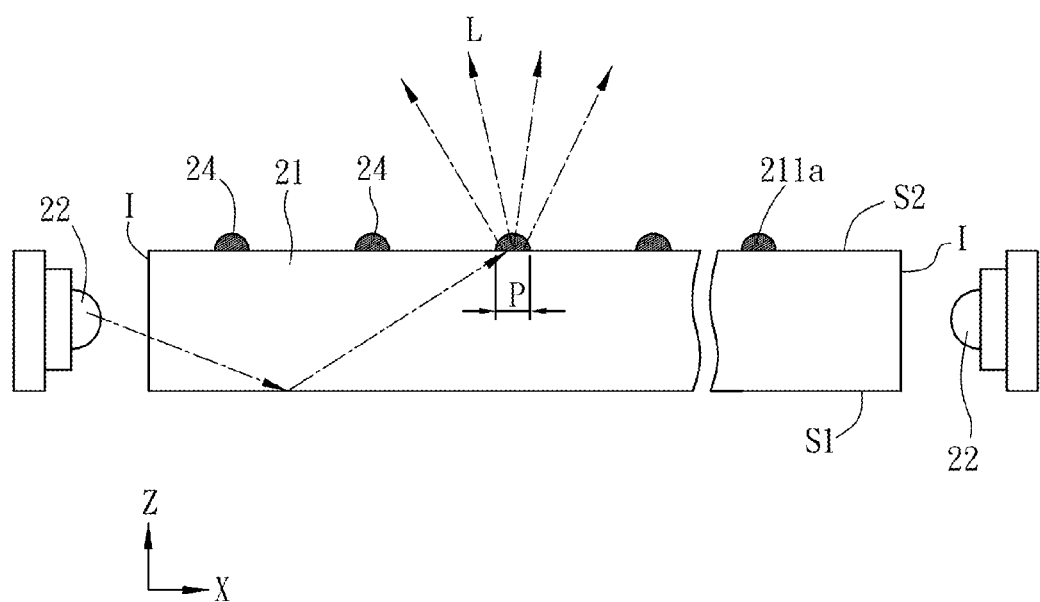
FIG. 2C is a schematic side view of a light-emitting module of another preferred embodiment of the invention.

FIG. 2C is a schematic side view of a light-emitting module of another preferred embodiment of the invention.

Referring to FIG. 2C, in this embodiment, the light-guiding elements 211a are disposed on the flat surface S2 (the top surface of the light-guiding plate 21). By viewing along a direction parallel with the flat surface S2 (as shown in FIG. 2C), the light-guiding elements 211a are substantially microstructures of protrusions. The reflective materials 24 are respectively disposed on the outer surfaces of the protrusions of the light-guiding elements 211a.

Besides, other technical features of the light-emitting module as shown in FIG. 2C can be understood by referring to FIG. 2B, so the detailed descriptions are omitted here.

Figure 3A:
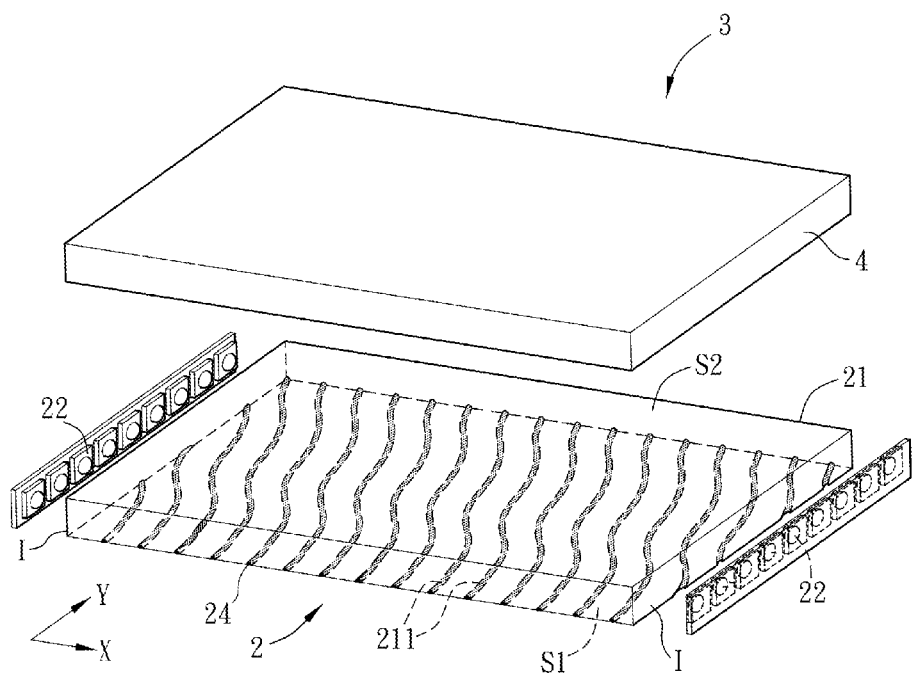
FIG. 3A is a schematic diagram of a display apparatus of a preferred embodiment of the invention.
Figure 3B:
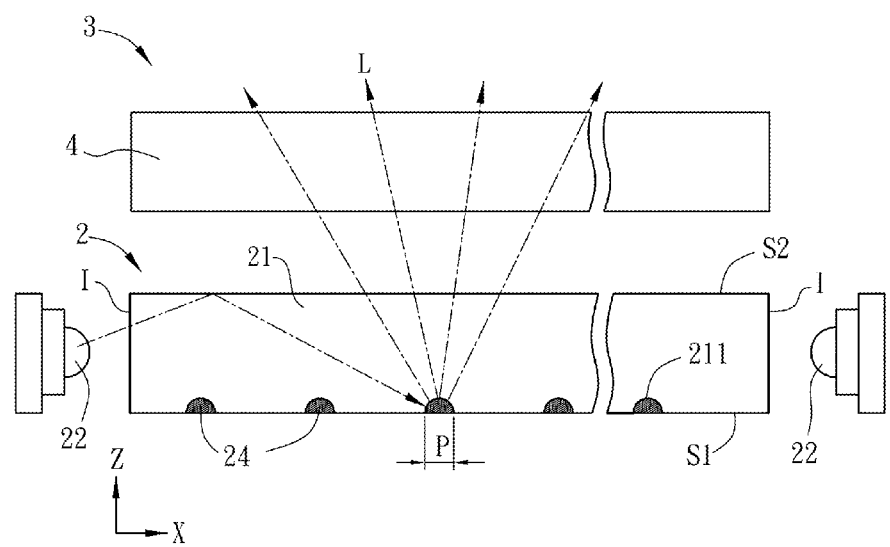
FIG. 3B is a side view of the display apparatus in FIG. 3A.

FIG. 3A is a schematic diagram of a display apparatus 3 of a preferred embodiment of the invention, and FIG. 3B is a side view of the display apparatus 3.

The light-emitting module 2 is disposed opposite to the display panel 4, and includes a light-guiding plate 21 and at least one light-emitting unit.

The light-guiding plate 21 includes a plurality of light-guiding elements 211, which are disposed on one of the flat surfaces of the light-guiding plate 21 and are instanced as disposed at the flat surface S1 (bottom surface). Since the light-guiding element 211 is microstructure of recess or protrusion with really small width of the cross-section, the light-guiding element 211 is substantially a curve when overlooked along the direction perpendicular to the flat surface S2. Herein, as shown in FIG. 3A, the centerline of the curviform light-guiding element 211 can be an oblique line not parallel with the directions X and Y. In other words, the said centerline and the direction X or Y can have an included angle between zero and 90 degrees. In other embodiments, the centerline of the light-guiding element 211 can be parallel with the direction X or Y, and that means, the centerline and the direction X or Y can have an included angle of zero or 90 degrees. Besides, any two light-guiding elements don't intersect each other, and any two adjacent light-guiding elements 211 have an space between zero and a width of the flat surface S1 where the light-guiding elements 211 are disposed. The cross-section of each of the light-guiding elements 211 as shown in FIG. 3B can be curviform, or a polygon (including a triangle, a square, a rectangle, a trapezoid, or a regular polygon) or an irregular form. Herein, the cross-section of each of the light-guiding elements 211 is instanced as curviform, such as a semicircle. To deserve to be mentioned, the cross-sections of the light-guiding elements 211 can be the same or different. Besides, the centerlines of the light-guiding elements 211 can have the same or different curvature. In this embodiment, all the light-guiding elements 211 are instanced with the same cross-section, space and curvature. Besides, by a side view as shown in FIG. 3B, each of the light-guiding elements 211 has a short-side width P, which can be between 50 μm and 150 μm.

The light-emitting unit is disposed adjacent to the light input surface I of the light-guiding plate 21, and emits the light L entering the light-guiding plate 21 through the light input surface I. Then, by the guiding of the light-guiding plate 21 and the light-guiding elements 211, the light L can be guided out through one of the surfaces (such as the flat surface S2) in an alternate form (alternating arrangement) of bright and dark zones. Herein, two light-emitting units 22 are disposed adjacent to the opposite light input surfaces I of the light-guiding plate 21, respectively, for example. The light emitted by the light-emitting units 22 enters the light-guiding plate 21 through the light input surface I, and goes out through the flat surface S2. The light-emitting unit 22 of this embodiment is instanced as an LED light bar. Besides, the reflective materials 24 are disposed in the light-guiding elements 211, respectively. Herein, the reflective material 24 is fully disposed in the light-guiding element 211 for example. Besides, other technical features of the light-emitting module 2 as shown in FIGS. 3A and 3B can be understood by referring to the above embodiments, so the detailed descriptions are omitted here.

Figure 3C:
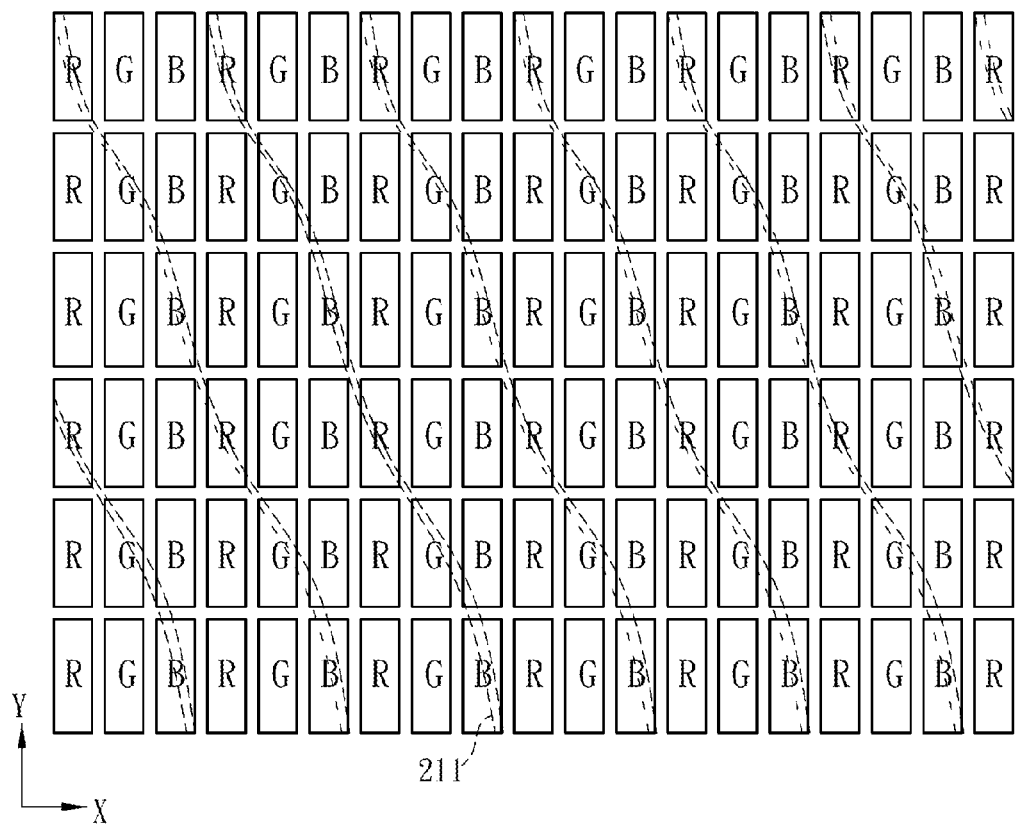
FIG. 3C is a schematic diagram showing a pixel array of the display panel and the light-guiding elements of the light-guiding plate in FIG. 3A.

FIG. 3C is a schematic diagram showing a pixel array of the display panel 4 and the light-guiding elements 211 of the light-guiding plate 21 in FIG. 3A. Herein, only partial sub-pixels of the display panel 4 and light-guiding elements 211 are shown in FIG. 3C.

The display panel 4 includes a plurality of pixels which are formed into an array in a direction X and a direction Y. The directions X and Y are perpendicular to each other (the same as the directions X and Y of the above embodiment). Besides, each of the pixels includes a plurality of sub-pixels which are also formed into an array. Herein, each pixel includes three sub-pixels R, G, B, for example. To be noted, the relative positions of the light-guiding elements 211 and the sub-pixels R, G, B are just for example in this embodiment, and they can be varied in other embodiments by, for example, changing the inclined level or curvature of the curve. For example, the centerline of the light-guiding element 211 inclines more to the direction X or Y.

Figure 3D:
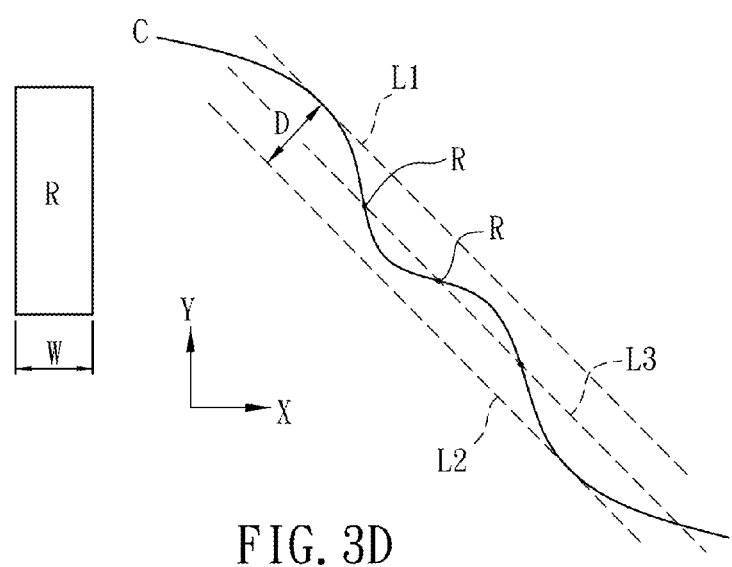
FIG. 3D is a schematic diagram of the inclined curve of a light-guiding element.

Besides, by viewing in a direction perpendicular to the flat surface S2 (i.e. overlooking), each of the light-guiding elements 211 is substantially shaped like a curve. The curve has a largest amplitude (i.e. largest swinging distance equal to the space of the closest parallel lines clipping the curve), which is less than or equal to one and a half times the short-side width of a sub-pixel, and greater than zero. In other words, as shown in FIG. 3D, the inclined curve of each of the light-guiding elements 211 is represented by the curve C including an inflection point R. The curve C has the closest parallel lines L1 and L2 clipping itself, and a centerline equally apart from the parallel lines L1 and L2 is called the centerline L3 of the curve C of the light-guiding element 211. The largest swinging amplitude of the curve C (i.e. the distance D in FIG. 3D) is less than or equal to one and a half times the short-side width W of a sub-pixel, and greater than zero. Herein, the largest amplitude is the largest distance for which the curve C swings, i.e. the distance between the tangent lines (L1 and L2) at the highest and lowest points of the curve C. The long-side width of the sub-pixel is generally three times the short-side width, but this is not for limiting the scope of the invention. The centerline line L3 of the light-guiding element 211 and the direction X or Y have an included angle (acute angle) between zero and 90 degrees.

Verified by the experiments, for the display apparatus 3 of the invention, when the light L is emitted to the display panel 4 through the flat surface S2 of the light-guiding plate 21 of the light-emitting module 2, it can be formed as curviform in an alternate form (alternating arrangement) of bright and dark zones. When passing through the display panel 4, such light can less interfere with the light-shielding layer (i.e. black matrix) of the display panel 4 so that the interference fringes are decreased a lot. Accordingly, the display quality of the display apparatus 3 is enhanced.

Furthermore, in another embodiment, the light-emitting module 2 of the display apparatus can further include a reflective plate and/or at least an optical film (not shown). The reflective plate can be disposed to one of the flat surfaces (e.g. the surface away from the display panel 4) for reflecting the light that has been emitted out through the surface back into the light-guiding plate 21. The optical film can be a diffusion sheet, and can be disposed between the light-emitting module 2 and the display panel 4 so that the light can be formed into an average surface light source through the diffusion sheet. A space can exist between the light-guiding plate 21 and each of the reflective plate or the optical film.

In another embodiment, the light-emitting module 2 can function as a parallax control device of a stereoscopic display apparatus to become a parallax barrier device. By such light-emitting module 2 as a parallax barrier device, when the light in an alternate form (alternating arrangement) of bright and dark zones passes through the display panel 4, the left image outputted by the pixels of the display panel 4 can be transmitted to the left eye of the user while the right image outputted by the pixels of the display panel 4 can be transmitted to the right eye of the user, so that the eyes of the user can respectively receive different images with binocular parallax for forming stereoscopic images to the user without wearing shutter or retarder glasses. To be noted, when the light-emitting module 2 functions as a parallax barrier device of a stereoscopic display apparatus, all the light-guiding elements 211 need to have the same curvature, and any two adjacent light-guiding elements 211 need to have the same space.

Figure 4A:
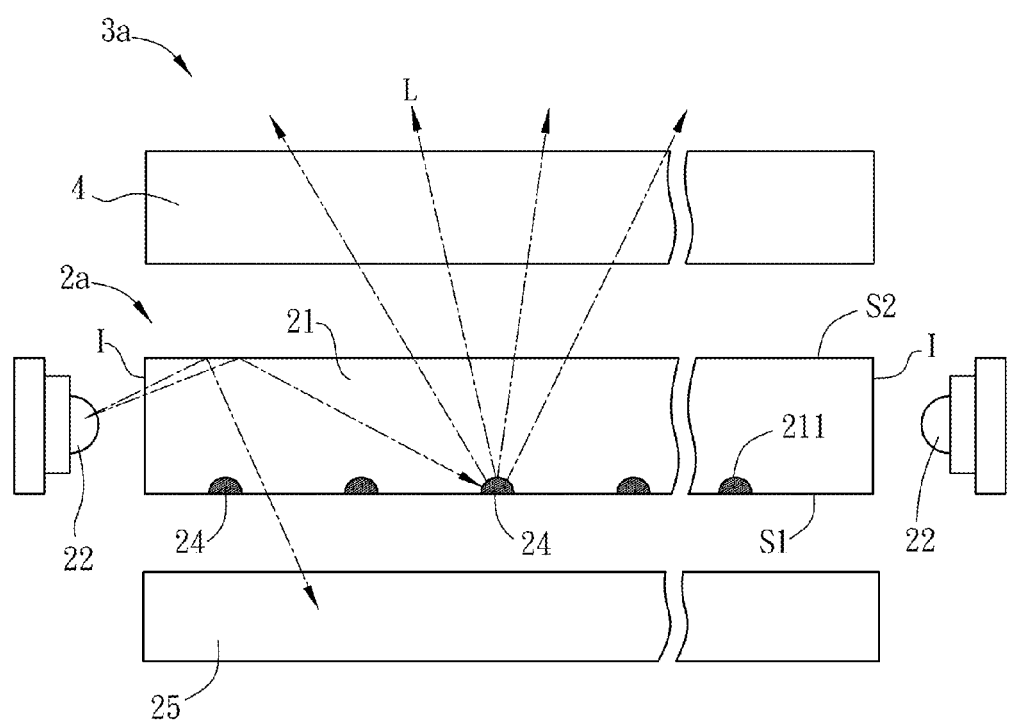
FIGS. 4A and 4B are side views of display apparatuses of other embodiments of the invention.

FIG. 4A is a side view of a display apparatus 3a of another embodiment of the invention.

Different from the display apparatus 3, when the light-emitting module 2a functions as the parallax barrier device of the display apparatus 3a to help the display apparatus 3a display 3D images, the light-emitting module 2a can further include a light attenuator 25 disposed to a side of the flat surface S1 of the light-guiding plate 21. When the light passes through the flat surface S1 of the light-guiding plate 21 and then enters the light attenuator 25, the light attenuator 25 can decrease (e.g. by absorbing) the light's energy to prevent the light out of the flat surface S1 from entering the light-guiding plate 21 again by the reflection. Therefore, the light output of the light-emitting module 2a will not be interfered, and the stereoscopic display efficiency of the display apparatus 3 can be enhanced.

Figure 4B:
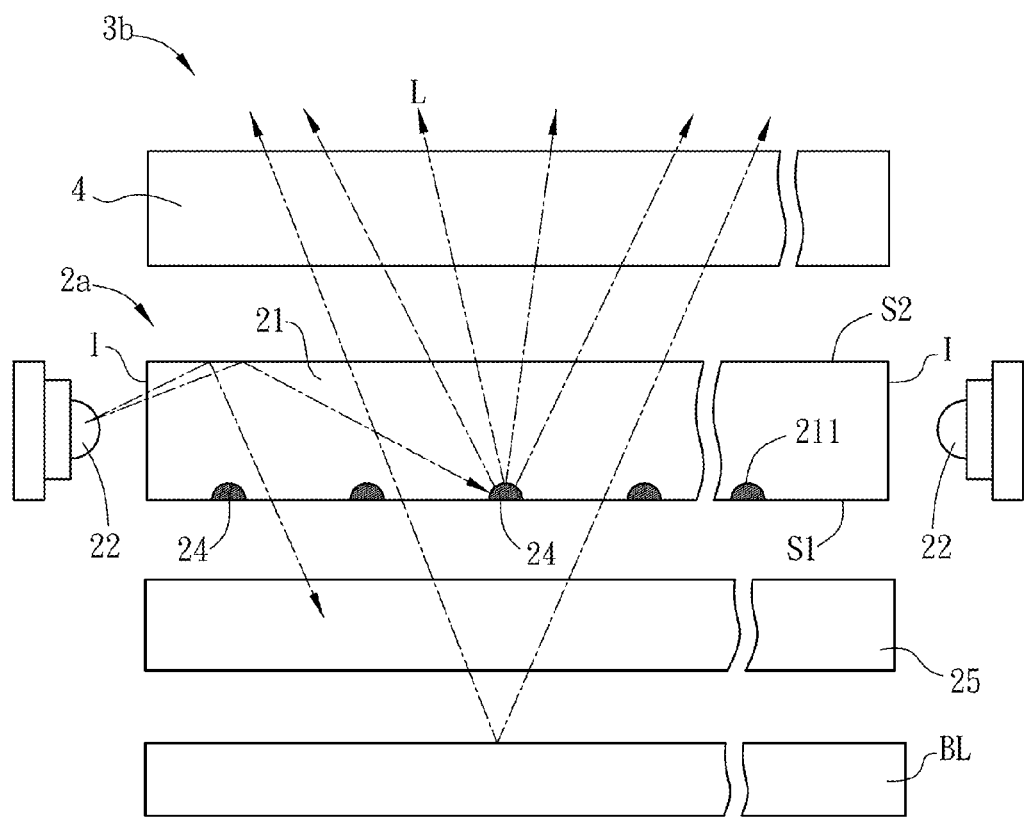

FIG. 4B is a side view of a display apparatus 3b of another embodiment of the invention.

When the light-emitting module 2a functions as the parallax barrier device of the display apparatus 3b, the display apparatus 3b can further include a backlight module BL disposed on a side of the light-emitting module 2a (which is between the display panel 4 and the backlight module BL) for providing the light to the display panel 4. If the display apparatus 3b displays 3D images (3D mode), the backlight module BL can be turned off, but the light-emitting module 2a is turned on for emitting light. If the display apparatus 3b displays 2D images (2D mode), the light-emitting module 2a and the backlight module BL can both be turned on for emitting light. Thereby, the display apparatus 3b can be switched to display 2D or 3D images.

Besides, other technical features of the light-emitting apparatuses 3a and 3b can be understood by referring to the display apparatus 3, so the detailed descriptions are omitted here.

In summary, the light-guiding plate of the invention includes a plurality of light-guiding elements which are disposed on one of the flat surfaces of the light-guiding plate and each are shaped like a curve-shape having at least an inflection point. Thereby, when emitted to the display panel through the surface of the light-guiding plate, the light can be formed on the surface as curviform in an alternate form (alternating arrangement) of bright and dark zones, by the disposition of the curviform light-guiding elements. Such light can decrease interference fringes caused by diffraction so that the display quality of the display apparatus can be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A 3D display device, comprising:
a display panel, comprising a plurality of sub-pixels, each of the plurality of sub-pixels comprising a first short-side width;
a light-guiding plate disposed adjacent to the display panel, comprising a first flat surface, a second flat surface, a light input surface, and a plurality of light-guiding elements, wherein the first flat surface is disposed between the display panel and the second flat surface, the light input surface is connected between the first flat surface and the second flat surface, and the light-guiding elements are disposed at the first flat surface or the second flat surface; and
a light-emitting unit disposed adjacent to the light input surface;
wherein each of the plurality of light-guiding elements comprising a curve shape with at least one inflection point;
wherein a shift range of the curve shape of the light-guiding element is greater than zero and less than or equal to one and a half times the first short-side width; and
wherein light emitted from the light-guiding unit enters the light-guiding plate, the light is guided by the light-guiding plate and the light-guiding elements, and the light is outputted through the first flat surface in an alternating arrangement of at least one bright zone and at least one dark zone.

2. The 3D display device as recited in claim 1, wherein the shift range of curve shape of the light-guiding element is two times the amplitude from a centerline of curve shape of the light-guiding element.

3. The 3D display device as recited in claim 1, wherein the light-guiding elements are disposed at the second surface of the light-guiding plate.

4. The 3D display device as recited in claim 1, wherein the light-guiding elements are disposed at the first surface of the light-guiding plate.

5. The 3D display device as recited in claim 1, wherein the light-guiding elements are recesses.

6. The 3D display device as recited in claim 1, wherein the light-guiding elements are protrusions.

7. The 3D display device as recited in claim 1, wherein the centerlines of the light-guiding elements are disposed with an inclined angle to a side surface of the light-guiding plate, the side surface is perpendicular to the light input surface and the first flat surface, and the inclined angle is greater than zero degree and less than 90 degrees.

8. The 3D display device as recited in claim 1, wherein the light-guiding elements are configured with a reflective material.

9. The 3D display device as recited in claim 1, wherein a second short-side width of each of the light-guiding element is between 50 um to 150 um.

10. The 3D display device as recited in claim 1, wherein the alternating arrangement of the light is a barrier pattern for 3D displaying.

11. The 3D display device as recited in claim 1, further comprising:
a backlight module, wherein the light-guiding plate is disposed between the display panel and the backlight module, wherein the backlight module is turned off when the display apparatus displays is in 3D mode, and the backlight module is turned on when the display apparatus displays is in 2D mode.

12. A 3D display apparatus, comprising:
a display panel, comprising a plurality of sub-pixels, each of the plurality of sub-pixels comprising a first short-side width;
a light-guiding plate disposed adjacent to the display panel, comprising a first flat surface, a second flat surface, a light input surface, and a plurality of light-guiding elements, wherein the first flat surface is disposed between the display panel and the second flat surface, the light input surface is connected between the first flat surface and the second flat surface, and the light-guiding elements are disposed at the first flat surface or the second flat surface;
a light-guiding unit disposed adjacent to the light input surface; and a backlight module, wherein light-guiding plate is disposed between the display panel and the backlight module;
wherein each of the plurality of light-guiding element comprising a curve shape with at least one inflection point;
wherein a shift range of the curve shape of the light-guiding element is greater than zero and less than or equal to one and a half times the first short-side width; and
wherein light emitted from the light-guiding unit enters the light-guiding plate, the light is guided by the light-guiding plate and the light-guiding elements, and the light is outputted through the first flat surface in an alternating arrangement of at least one bright zone and at least one dark zone.

13. The 3D display apparatus as recited in claim 12, wherein the shift range of curve shape of the light-guiding element is two times the amplitude from a centerline of curve shape of the light-guiding element.

14. The 3D display apparatus as recited in claim 12, wherein the light-guiding elements are disposed at the second surface of the light-guiding plate.

15. The 3D display apparatus as recited in claim 12, wherein the light-guiding elements are disposed at the first surface of the light-guiding plate.

16. The 3D display apparatus as recited in claim 12, wherein the light-guiding elements are recesses or protrusions.

17. The 3D display apparatus as recited in claim 12, wherein the centerlines of the light-guiding elements are disposed with an inclined angle to a side surface of the light-guiding plate, the side surface is perpendicular to the light input surface and the first flat surface, and the inclined angle is greater than zero degree and less than 90 degrees.

18. The 3D display apparatus as recited in claim 12, wherein the light-guiding elements are configured with a reflective material.

19. The 3D display apparatus as recited in claim 12, wherein a second short-side width of each of the light-guiding element is between 50 um to 150 um.

20. The 3D display apparatus as recited in claim 12, wherein the alternating arrangement of the light is a barrier pattern for 3D displaying.

* * * * *